United States Patent [19]
Calvert et al.

[11] Patent Number: 5,415,340
[45] Date of Patent: May 16, 1995

[54] HEAT SEALED PAPERBOARD CARTON HAVING A PATTERNED SOLVENT-BASED POLYMER COATING ON ONE SIDE ONLY

[75] Inventors: Barry G. Calvert, Covington; Walter H. Donnellan, III, Hot Springs, both of Va.

[73] Assignee: Westvaco Corporation, New York, N.Y.

[21] Appl. No.: 161,525

[22] Filed: Dec. 6, 1993

[51] Int. Cl.⁶ .................... B65D 5/40; B65D 5/62
[52] U.S. Cl. ..................... 229/3.1; 229/186; 428/34.2
[58] Field of Search ............. 229/3.1, 132, 141, 154, 229/186, 902, 903; 206/813; 428/34.2

[56] References Cited

U.S. PATENT DOCUMENTS

| | | |
|---|---|---|
| 3,146,933 | 9/1964 | Moore . |
| 3,212,697 | 10/1965 | Anderson .............................. 229/3.1 |
| 3,249,282 | 9/1966 | Kuehn, Jr. . |
| 3,257,065 | 6/1966 | Bowman et al. . |
| 3,355,085 | 11/1967 | Lindstrom . |
| 3,361,325 | 1/1968 | Hakansson et al. . |
| 3,788,876 | 1/1974 | Baker et al. . |
| 3,877,630 | 4/1975 | Silver .................... 229/3.1 |
| 4,249,978 | 2/1981 | Baker . |
| 4,306,658 | 12/1981 | Montealegre ..................... 229/186 |
| 4,340,169 | 7/1982 | Webinger ......................... 229/186 |
| 4,558,815 | 12/1985 | Wischusen, III .................. 229/186 |
| 4,784,708 | 11/1988 | Allen . |
| 4,826,475 | 5/1989 | Eweryd . |
| 4,930,639 | 6/1990 | Rigby . |
| 5,217,159 | 6/1993 | Calvert et al. . |
| 5,288,272 | 7/1993 | Calvert et al. . |

FOREIGN PATENT DOCUMENTS

| | | |
|---|---|---|
| 869286 | 5/1961 | United Kingdom . |
| 2032393 | 5/1980 | United Kingdom ............. 229/3.1 |

OTHER PUBLICATIONS

The Wiley Encyclopedia of Packaging Technology, John Wiley & Sons, pp. 14–16 (1986).

*Primary Examiner*—Gary E. Elkins
*Attorney, Agent, or Firm*—J. R. McDaniel; R. L. Schmalz

[57] ABSTRACT

Folded paperboard food cartons having a barrier polymer coating only on the interior surface and sales graphics on a substantially unplasticized clay coated exterior surface are heat sealed at contiguous areas of overlapping flaps wherein the polymer coated interior surface is in direct contact with a small portion of the clay coated exterior surface or where it is desired to secure together two portions of the clay coated exterior surface. In such heat sealing areas, small and accurately located exterior clay coated carton surface areas are printed with a patterned solvent based polymer material that is precisely applied to such areas by a printing press.

12 Claims, 3 Drawing Sheets

HEAT SEALED PAPERBOARD CARTON HAVING A PATTERNED SOLVENT-BASED POLYMER COATING ON ONE SIDE ONLY

BACKGROUND OF THE INVENTION

1. Field of the Invention

The present invention relates to paperboard food packages. More particularly, the invention relates to a process for heat sealing paperboard food packages and the packages produced by the process.

2. Description of the Prior Art

One or two serving portions of precooked and/or frozen food are frequently packaged for consumer distribution in paperboard trays. Such trays are folded from preprinted and die-cut paperboard blanks.

Lids for these paperboard trays may take one of several forms including a lid that is an integral continuation of the same paperboard blank from which the tray is erected, such a lid flap being crease hinged to one sidewall of the tray. Another type of lid is an independent paperboard blank that is adhesively secured or plastic fuse bonded to a small perimeter flange folded from the upper edge of the tray sidewalls.

To protect the food contacting surfaces of the paperboard tray and lid from moisture penetration, the internal surfaces are coated with one or more continuous films of extruded thermoplastic. This internal moisture barrier is applied as a free-flowing curtain to the paperboard while still in the continuous web form and, prior to printing and cutting the paperboard into blanks. Low-density polyethylene (LDPE), polypropylene (PP) and polyethylene terephthalate (PET) are merely three of the more popular thermoplastic polymers used for this purpose.

However, if the paperboard blanks have closures which require the bonding of a polymer coated interior surface to a non-polymer coated exterior surface, it may be necessary to also coat the exterior of the tray and lid with an external coating of polymer for the primary function of heat sealing these surfaces to one another.

As with all conventional fourdrinier laid paper webs, bleached paperboard is produced with a "felt side" and a "wire side." For food packaging, the felt side is preferred for the thermoplastic food moisture barrier. This felt side becomes the interior of a food package formed from the paperboard. The wire side is given a clay coating that is smoothed by calendering to provide a superior print surface. The wire side becomes the exterior of a food package formed from the paperboard. However, the clay coated paperboard surface will not readily adhere to a surface having a polymer coating. Consequently, it is difficult to secure a reliable heat seal between an interior thermoplastic surface of a paperboard package and the exterior clay coated surface as described above.

A specific example arises with respect to a tray having an integrally hinged lid with flaps extending from the lid for overlapping three tray sidewalls. The tray contents are tightly enclosed by bonding the interior surfaces of the polymer coated lid flaps against the exterior clay coated surfaces of the three tray sidewalls. Production line pace permits less than 1 second to secure the flap-to-wall bonds. The present invention focuses upon the mechanics of these bonds.

As previously inferred, the predominately practiced prior art avoids the polymer-to-clay surface bonding problem by curtain coating the entire clay-coated wire side of the paperboard web with an extruded film of an extremely hot, viscously flowing polymer, in the same manner as the food moisture barrier is applied to the paperboard web felt side. Frequently, the clay surface of the wire side is pretreated by open flame or corona discharge immediately prior to hot polymer contact to enhance deep bonding of the polymer with the topically applied clay and underlying paper fiber. By this expedient, both the underside surfaces of the tray lid flaps and the exterior surfaces of the tray sidewalls are coated with the same or at least compatible polymers and are easily fuse bonded at a low tack temperature and a low joint compression pressure.

However, polymer coating an entire exterior package surface, for the singular reason of effecting a reliable, rapid and low pressure heat seal between the tray side walls and the lid closure flaps, produce several collateral consequences that must be accommodated. The first and obvious consequence is economic. Proportionately, the exterior polymer coat adds significantly to the total package cost. Moreover, only a small proportion of the full exterior surface coating is actually functional for the purpose for which it is applied. A second, adverse consequence is caused by the poor ink receptivity by the exterior polymer coating which necessitates the use of specialized, volatile inks for the colorful sales and informational graphics applied to the exterior surfaces of these packages. Use of these inks creates additional economic, safety and environmental concerns. Also, the exterior polymer coat is softer than the clay coat and, therefore, mars and scratches more easily. Finally, the additional polymer coating further complicates beneficial disposal of the used packaging by composting or repulping and recycling of the fiber composition of the package.

As additional factors to the present invention's prior art and development, it should be understood that a typical commercial food tray filling line advances at the rate of 60 to 120 units per minute. Consequently, any step or process in the continuous production line that requires a full stop of the subject unit must be accomplished in one second or less. Other processing steps are performed on a moving unit. Moreover, once the tray is filled with a food product and the lid positioned, the tray's inside surfaces are inaccessible for nip pressure backing. Any force applied to a lid flap for sealing against a tray side wall must be less than the crushing capacity of the erected tray. Frequently, only a gentle touch is permissible.

In addition to the previously described expedient of heat fusing polymer coatings applied to both paperboard surfaces, the prior art has also relied upon both cold set and hot set adhesives to achieve lid-to-tray seals. However, each of these adhesive sealing devices carry respective adverse consequences. Cold set adhesives are extremely slow setting and, therefore, incompatible with a production capacity of 120 units per minute. Hot melt adhesives have relatively low softening temperatures which are incompatible with typical oven temperatures used when the food within the package is heated for consumption.

It has previously been suggested that paperboard cartons of the type disclosed herein may be successfully sealed with the use of water based polymer adhesives as the sealing means. Exemplary prior art paperboard cartons are disclosed in commonly assigned U.S. Pat. Nos. 5,217,159 ('159) and 5,228,272 ('272) both to B. G.

Calvert et al., respectively entitled "Heat Sealed Paperboard Carton Having Polymer Coating on One Side Only" and "Product and Process for Heat Sealing a Paperboard Carton Having Polymer Coating on One Side Only." The water based polymer adhesives of the ('159) and ('272) patents perform particularly well when the exterior of the carton blanks are printed with water based inks. However, when the carton blanks are printed with organic solvent based inks, the organic solvent base adhesives of the present invention are preferred. The use of an organic solvent based adhesive under such circumstances improves the wettability of the printed surfaces thereby increasing bonding strength, and yields reduced drying loads on the press as compared with water based adhesives. Moreover, organic solvent based adhesives are preferred for cartons used to package frozen foods where the water based adhesives are susceptible to cracking. Finally, the use of water based adhesives do not provide the manufacturer of such cartons with as great of a variety of coatings with higher solids that the organic solvent based adhesive solutions can provide.

It is apparent therefore, from the above, that there exists a need in the art for a paperboard carton which is coated with a polymer coating on one side only and which relies on a solvent based adhesive applied in specific patterns to provide a means of sealing. It is the purpose of this invention to fulfill this and other needs in the art in a manner more apparent to the skilled artisan once given the following disclosure.

SUMMARY OF THE INVENTION

Generally speaking, this invention fulfills these needs by providing a composite material package blank formed from a paperboard web having a barrier coating of a thermoplastic polymer film uniformly applied to an inside surface thereof, and an outside surface of said paperboard is printed with aqueous or organic solvent based inks and includes selectively positioned areas of a solvent based polymer material applied thereto.

A BRIEF DESCRIPTION OF THE DRAWINGS

The above and other features of the present invention will become more apparent as the description proceeds and are best understood by considering the following detailed description in conjunction with the accompanying drawings wherein like characters represent like parts throughout the several views and in which.

DESCRIPTION OF THE PREFERRED EMBODIMENTS

Figure 1:
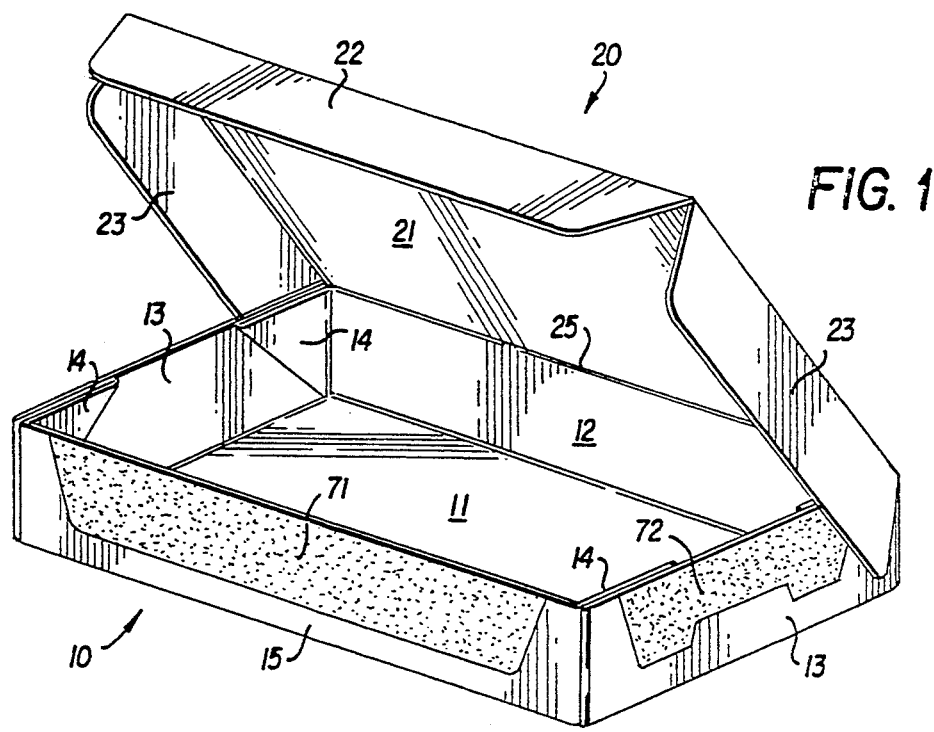
FIG. 1 is a perspective view of a first package embodiment of the invention.
Figure 2:
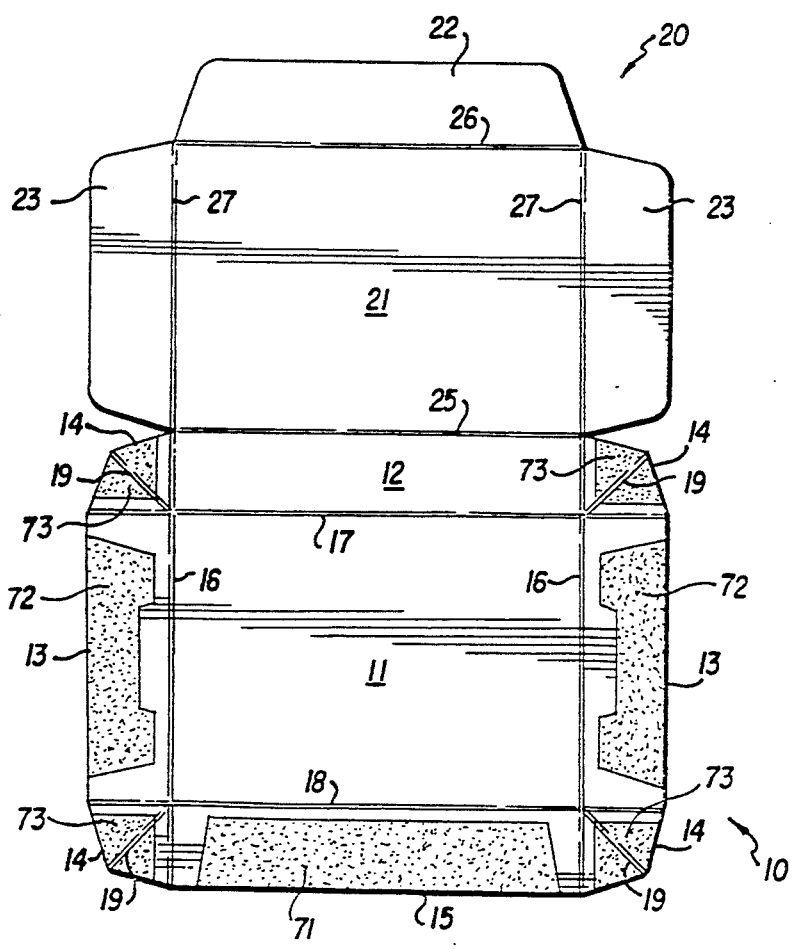
FIG. 2 is an exterior surface plan view of a cut, scored and printed blank for fabricating the FIG. 1 package.

The pictorial illustration of FIG. 1 represents an erected paperboard carton which embodies the present invention's principles. FIG. 2 illustrates a flat sheet paperboard blank, cut, scored and printed to be erected to the FIG. 1 form and configuration.

With respect to FIGS. 1 and 2, the carton broadly comprises a tray 10 and a closure 20. The tray components include a bottom panel 11, end walls 13, back wall 12, front wall 15 and corner gussets 14. The closure components include a top panel 21, front flap 22 and end flaps 23. Score line 25 between top panel 21 and back wall 12 functions as an integral hinge for closure 20.

The paperboard substrate for the present invention is, typically, a 0.018 inch thick bleached sheet. Definitively, the term "paperboard" describes paper within the thickness range of 0.008 to 0.028 inches. The invention is relevant to the full scope of such a range, as applied to packaging and beyond.

One face or side of the paperboard sheet or web, usually the wire side, receives a fluidized mixture of finely particulated mineral and binder as a smoothly screeded coating. Minerals such as clay and calcium carbonate are most frequently used. Successive densification and polishing, by calendering, finishes the mineral coated surface to a high degree of smoothness and a superior graphics print surface. This clay coated surface is prepared to become the exterior surface of a present invention food package.

The other face or side of the paperboard sheet or web is coated with an extruded film of polymer for the purpose of a protective barrier and moisture confinement. In the extrusion process, the polymer is heated to a viscous flow temperature and extruded as a curtain onto the traveling surface of the web or sheet. Ten to eleven pounds of polymer per ream (3000 ft$^2$) of paperboard surface is an adequate application rate for most purposes but rates of five to twenty pounds per ream have been used.

As previously explained, one of the commercially valuable characteristics of paperboard as a food packaging material is the superior print surface provided by the calendered mineral coating. However, a surface coat of polymer applied to the inner side of the food package will not reliably heat bond to the unprimed and unplasticized clay coated exterior surface. The terms "heat bonding", "fuse bonding" or "heat sealing" are used interchangeably to describe the process of heating a thermoplastic polymer to a tacky state for the purpose of structurally bonding to another surface. The traditional prior art practice requires both surfaces to be joined to have polymer coatings, both of which are heated to a tacky temperature for joining.

The present invention anticipates a package construction similar to that of FIG. 1 wherein the closure top panel 21 is secured against the exposed edges of erected sides 13 and 15 by heat sealing the inside surfaces of top flaps 22 and 23 to the outside surfaces of contiguous sides 13 and 15. The inside face of top flaps 22 and 23 are coated with a polymer. However, the outside face of tray sides 13 and 15 are merely clay coated.

In lieu of a hot curtain coat of polymer applied uniformly over the clay coated surface, the present invention provides precisely delineated, printing press applied areas of solvent based adhesive materials to those exterior tray sides and corner gussets as represented by the cross-hatched areas 71 and 72 of tray sides 13 and 15 and cross-hatched areas 73 of corner gussets 14.

Adcote 40-3E and 33R2-AH produced by Morton International, Inc. of Woodstock, Ill. are proprietary polymer solutions having the desirable properties and characteristics. The tack temperature is about 375° F. and the application rate may range from 0.5 lb/ream to 4.0 lbs/ream although most applications will find an application rate of 2 to 3 lbs/ream to be preferable. The working viscosity of such solutions are reduced by the addition of solvent.

In the normal course of events, printed, cut and scored package blanks which are formed from a web of paperboard, as depicted by FIG. 2, are delivered in an open or flat configuration. Either on or off the product filling line, the tray 10 is erected by folding the tray bottom walls 12, 13 and 15 about respective score lines 17, 16 and 18 to a position 90° from the bottom panel 11. Similarly, top flaps 22 and 23 are folded 90° with respect to top panel 21 about respective score lines 26 and 27. The folds described are merely break-overs, meaning that due to the high degree of paperboard stiffness and memory, the 90° fold position will not be retained without additional means of positional security. Gussets 14 provide such security to the tray walls.

As the printed pattern-applied polymer applied to the cross-hatched gusset areas 73 is heated to the tack temperature, the gusset panels are folded about gusset scores 19 and the integral tray walls 12, 13 and 15 are turned to the erect position. These dynamics bring the gusset half portions on opposite sides of a respective gusset score 19 into face-to-face opposition and contact. At tack temperature, the pattern-applied polymer fuses. Subsequent chilling secures the folded gusset position and, hence, the erect positions of the tray walls.

Although secured, each folded gusset 14 projects a triangular fin into the tray vessel space. This disadvantage is dispatched as shown by FIG. 1 by heating one side of each triangular gusset fin and a portion of an adjacent wall. In this configuration, it will be recalled that the entire inside surface of the package blank is coated with polymer. This inside polymer coating covers both triangular sides of the gusset and respective tray walls. Selective heating and pressure will secure the gusset fin to the inside plane of a respective side wall 13.

To be further noted from the geometry of gusset 14 is that no cut edge is presented to the internal vessel volume formed within the tray walls. All surfaces within that vessel volume have been coated by the moisture barrier polymer.

Figure 3:
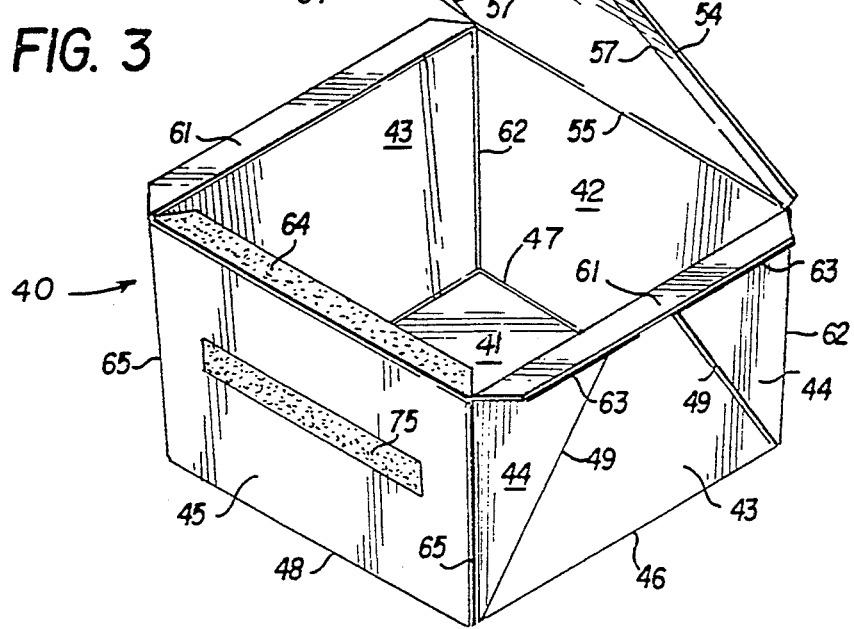
FIG. 3 is a perspective view of a second package embodiment of the invention.
Figure 4:
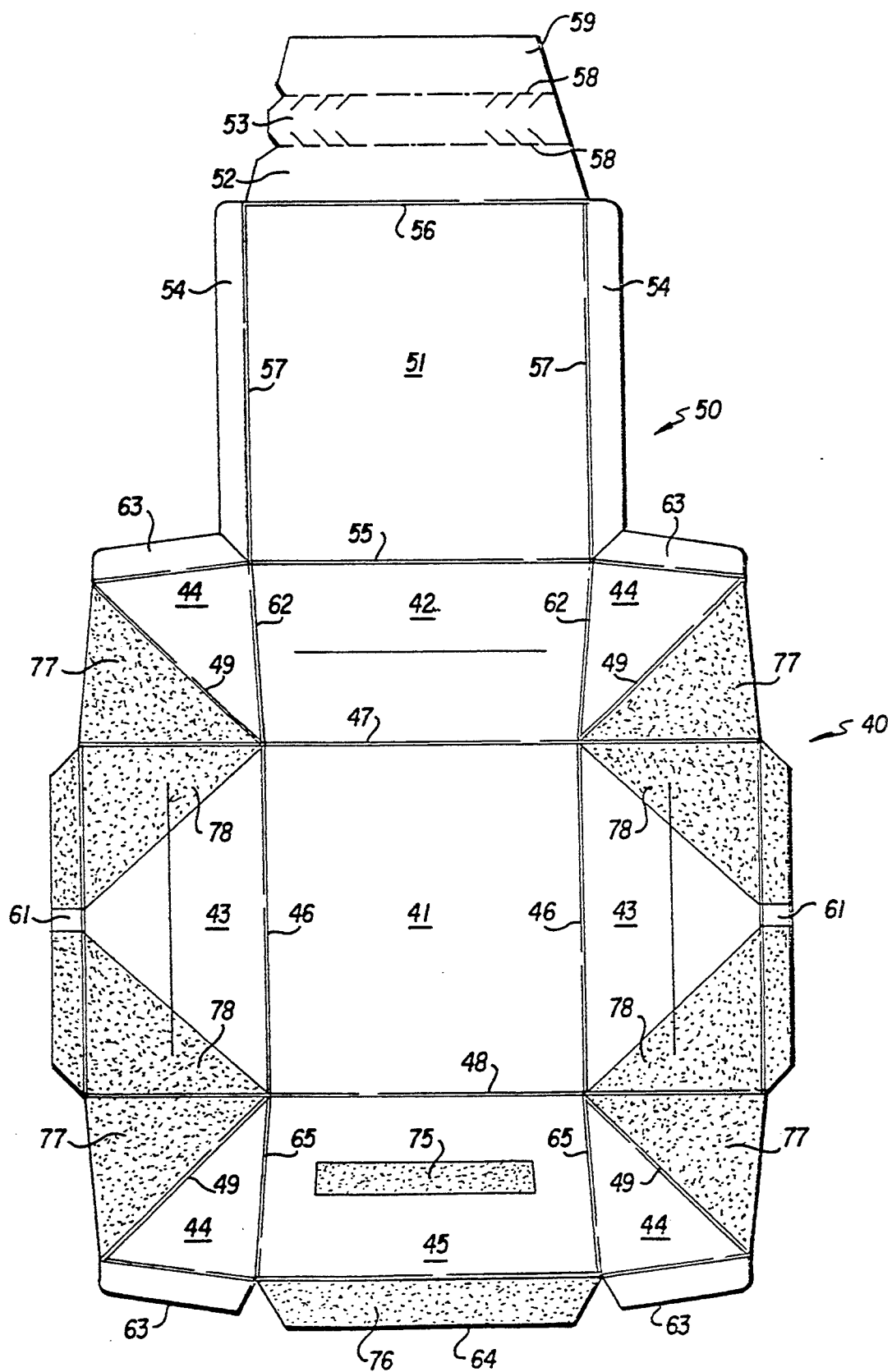
FIG. 4 is an exterior surface plan view of a cut, scored and printed blank for fabricating the FIG. 3 package.

FIGS. 3 and 4 represent a second embodiment of the invention having a deeper vessel portion 40 closed by cover portion 50. Bottom edge score line 47 joins back wall 42 to bottom panel 41, score lines 46 join side walls 43 to bottom panel 41 and score line 48 joins the front wall 45 to bottom panel 41. Score line 55 hinges top panel 51 to back wall 42. Score line 56 hinges top panel 51 to front closure flap 52 and score lines 57 hinge top panel 51 to side closure tabs 54. A rip strip 53 between parallel rows of perforation lines 58 facilitates opening of the sealed package by providing lines of strip tear weakness between end portion 59 of front closure flap 52 and top panel 51. When closed, end portion 59 is fuse bonded to front wall 45 at pattern-applied polymer strip 75. Additional sealing may be provided by pattern-applied polymer coating 76 on front wall tab 64 which is heat fused to the applied polymer coating on the underside of top panel 51.

In this embodiment of FIGS. 3 and 4, the fins formed by folding gussets 44 about score line 49 are projected to the outer perimeter of the erected package and secured to the outer face of side walls 43. Pattern-applied polymer material areas 77, printed on the outer clay surface of the paperboard blank, permit that face of the triangular fin to be heat fused to the pattern-applied polymer areas 78 along the side walls 43. The inside surfaces of gusset tabs 63 are heat fused to the outside surfaces of side wall tabs 61 for assembled rigidity.

Completion of the package seal includes a heat fusion between the inside polymer coat surfaces respective of side wall tabs 61 and top closure tabs 54.

Tray erection is normally accomplished by progressive roll forming of the paperboard blank over a traveling mandrel. At this point in the process, both sides of the blank, inside and outside, are accessible to the forming structure. After the tray is erected and filled with product, however, tooling structure can no longer be placed against the inside wall surfaces. For example, sealing the closure flaps 22 and 23 to the exterior surfaces of the tray walls 13 and 15 must be accomplished with no more sealing pressure than is permitted by the free standing paperboard material.

Figure 5:
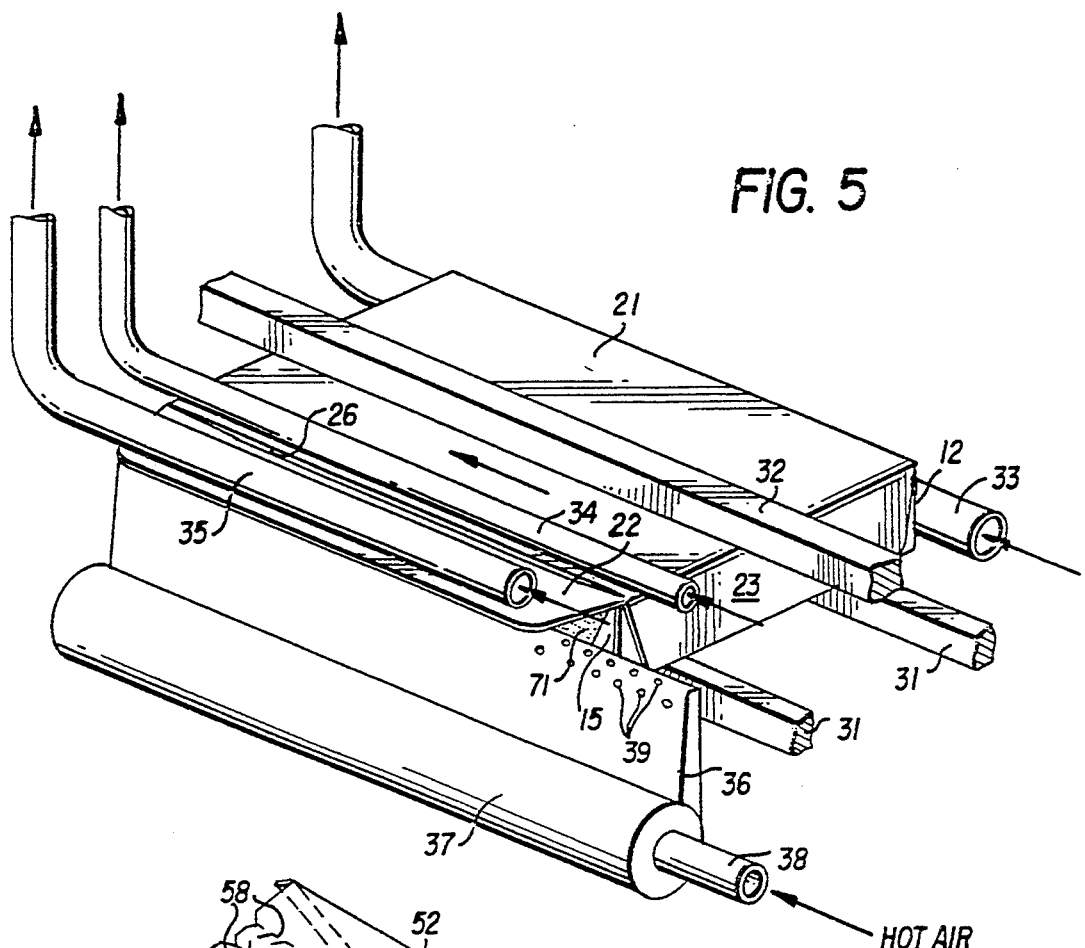
FIG. 5 is a typical heating apparatus for preparing a present invention package to be sealed at the end of a filling line.

Production systems to accomplish the flap closure seals include structure such as represented by FIG. 5 which includes a pair of carrier rails 31. A traveling series of trays are supported by carrier rails 31 and vertically confined by top rail 32.

Laterally, the line of moving trays is confined by back bar 33 which is a fluid conduit for heat control. Similarly, liquid cooled guide pipe 34 holds the tray closure panel 21 down against the upper edge of tray front wall 15 while liquid cooled guide pipe 35 confines the angle of rotation that flap 22 is allowed to rotate about score line 26.

Within the angular space between the underside of flap 22, which has an extruded polymer barrier film, and the exterior face of the tray front wall 15, which has a pattern-applied polymer area, is an elongated hot air nozzle 36. A hot air carrier conduit 38 guides air or gas, typically, at a temperature of 800° F. to 1100° F., from a source into distribution manifold 37 and nozzle 36. Nozzle orifices 39 direct the hot air against the opposing polymer surfaces respective to flap 22 and wall 15.

Immediately following passage of a tray past the heating nozzle 36, a shoe structure (not shown) presses front flap 22 against wall 15 to fuse the extruded barrier coating on flap 22 with the pattern-applied polymer on wall 15.

At other heating and pressing stations along the sealing line, end flaps 23 are fused to the tray end walls 13 in the same manner as described from FIG. 5.

Once given the above disclosure, many other features, modifications or improvements will become apparent to the skilled artisan. Such features, modifications or improvements are therefore, considered to be a part of this invention, the scope of which is to be determined by the following claims.

What is claimed is:

1. A composite material package blank formed from a paperboard web having a barrier coating of a thermoplastic polymer film uniformly applied to an inside surface thereof and an outside surface of said paperboard web is printed with aqueous or solvent based inks and includes selectively positioned areas of a patterned solvent based polymer material applied thereto.

2. The composite material package blank, as described by claim 1, wherein said paperboard web is folded about score lines to provide side walls integrally projected from a bottom panel, said side walls being laterally linked by integral gusset webs, at least one of said side walls having a cover panel integrally appended thereto from a hinge score line, said cover panel having a flap extension therefrom for lapping a side wall other than said one side wall and being secured thereto by a fuse bond between said inside surface coating of said polymer film on said flap extension and a selectively positioned area of said patterned solvent based polymer material on the outside surface of said other side wall.

3. The composite material package blank, as described by claim 2, wherein said gusset webs are folded into lapped, triangular panels to erect said sidewalls about said score lines, said triangular panels being projected into an internal volume of a package erected from said blank between said erected sidewalls and secured to and substantially parallel with one of said integrally connected package sidewalls by fuse bonds between inside surface coated portions of said triangular panels and inside surface coated portions of said sidewalls.

4. The composite material package blank, as described by claim 3, wherein said triangular panels of said gusset webs are secured together by fuse bonds between said selectively positioned areas of said patterned solvent based polymer material respective to outside surface portions of said triangular panels.

5. The composite material package blank, as described by claim 2, wherein said gusset webs are folded into lapped, triangular panels to erect said sidewalls about said score lines, said triangular panels being projected externally from said internal volume of said package between said erected sidewalls and secured to and substantially parallel with a package sidewall by a fuse bond between said selectively positioned areas of said patterned solvent based polymer material on outside surface portions of said triangular panels and sidewalls.

6. The composite material package blank, as described by claim 5, wherein said triangular panels of said gusset webs are secured together by fuse bonds between inside surface portions of said triangular panels.

7. A folded paperboard package manufactured from a paperboard web wherein said package is comprised of: interior and exterior surfaces and a vessel portion such that said interior surfaces include a coating of a substantially continuous thermoplastic film applied thereto; said exterior surface having a uniformly calendered coating of mineral particulates supporting respective areas of press applied graphics and a solvent based patterned polymer material; and, said vessel portion of said package having an interior volume closed by a cover portion such that said cover portion and vessel portion are connected by an integral hinge score and said cover portion being secured at an interior volume closure position by a fuse bond between said areas of pattern-applied solvent based polymer material and said interior surface film.

8. The paperboard package, as described by claim 7, wherein said internal volume is formed by erecting paperboard blank sidewalls about fold lines defining a bottom panel perimeter and sidewalls adjacent to each other and said perimeter having edges that are integrally connected by a gusset.

9. The paperboard package, as described by claim 8, wherein said gusset is folded into lapped, triangular panels projected into said internal volume and secured to and substantially parallel with one of said integrally connected package sidewalls by fuse bonds between interior surface coated portions of said triangular panels and interior surface coated portions of said sidewalls.

10. The paperboard package as described by claim 9, wherein said lapped, triangular panels, respective to said gussets, are secured together by fuse bonds between said areas of pattern-applied polymer material respective to exterior surface portions of said triangular panels.

11. The paperboard package, as described by claim 8, wherein said gussets are folded into lapped, triangular panels projected externally of said internal volume and secured to and substantially parallel with one of said integrally connected package sidewalls by fuse bonds between areas of said polymer material applied to exterior surface portions of said triangular panels and said sidewalls.

12. The paperboard package, as described by claim 11, wherein said lapped triangular panels respective to said gussets are secured together by fuse bonds between interior surface coated portions of said triangular panels.

* * * * *